United States Patent [19]

Kishine et al.

[11] Patent Number: 4,690,051

[45] Date of Patent: Sep. 1, 1987

[54] METHOD OF IMAGE REGISTRATION IN A WEB FED, MULTIPLE PRINTING ROTARY PRESS

[75] Inventors: Toshiaki Kishine; Hideo Izawa, both of Yachiyo; Masaru Ohba, Funabashi, all of Japan

[73] Assignee: Miyakoshi Printing Machinery Co., Ltd., Tokyo, Japan

[21] Appl. No.: 828,737

[22] Filed: Feb. 12, 1986

[51] Int. Cl.$^4$ .......................... B41F 5/06; B41F 5/16; B41F 13/14

[52] U.S. Cl. ..................................... 101/211; 101/181

[58] Field of Search ............... 101/181, 180, 248, 228, 101/178, 179, 219–221, 225, 227, 231, 211, 426; 226/2, 3, 28–31, 34, 35; 250/571, 559, 560, 56; 340/675

[56] References Cited

U.S. PATENT DOCUMENTS 4,177,730 12/1979 Schriber et al. ..................... 101/248
4,366,753 1/1983 Glanz et al. ..................... 101/227 X
4,391,190 7/1983 Metzler ........................... 318/603 X
4,484,522 11/1984 Simeth ................................ 101/181

*Primary Examiner*—J. Reed Fisher
*Attorney, Agent, or Firm*—Vorys, Sater, Seymour and Pease

[57] ABSTRACT

For image registration as in a web fed, multiple color printing press, printing plates are employed each bearing a registration mark having a first line segment extending transversely of the web and a second line segment extending aslantly of the web. The registration marks are so located on the printing plates that their images reproduced on the web are in a row arranged longitudinally of the web and with spacings from one to another. The printed images of the registration marks on the traveling web are sensed optically in order to determine the actual distances between them and between the first and second line segments of each registration mark. The thus ascertained actual distances are converted into corresponding numbers of reference pulses, and these pulse numbers are compared with reference pulse numbers representative of the proper distances. The angular positions of the plate cylinders are adjusted in accordance with the differences between the pulse numbers representative of the actual distances between the registration mark images and the corresponding proper pulse numbers, whereas the lateral positions of the plate cylinders are adjusted in accordance with the difference between the pulse number representative of the actual distance between the first and second line segments of each mark and the corresponding proper pulse number.

4 Claims, 4 Drawing Figures

METHOD OF IMAGE REGISTRATION IN A WEB FED, MULTIPLE PRINTING ROTARY PRESS

BACKGROUND OF THE INVENTION

Our invention concerns a method of achieving image registration in a web fed, rotary printing press of the class having a series of print stations for successively imprinting images of different colors, for example, on a continuous web of paper or like material traveling along a predetermined path through the print stations.

The image registration method of our invention finds a typical application in rotary web presses of the type used in the manufacture of business forms, wherein the web travels through a succession of stations such as those for printing, perforating, numbering, punching, slitting, and zigzag folding. An example of this type of printing apparatus is extensively discussed in U.S. Pat. No. 4,177,730 issued Dec. 11, 1979, to Schriber et al. and entitled "Method And Apparatus for Web Printing".

In a multicolor web press the exact registration of the different color images on the web is of utmost importance for the manufacture of high quality products. The conventional practice for such image registration has been to visually examine the relative displacements of the images of registration marks that have been imprinted on test paper by the successive plate cylinders. Any one or more of the plate cylinders have then been adjusted circumferentially and/or laterally to an extent determined by the relative displacement of the registration mark images in the longitudinal and/or transverse direction of the web. We object to this long familiar practice because of the prolonged makeready time and waste of paper involved as it usually requires several test printings before all the plate cylinders come into complete alignment.

We are aware of recent efforts in the printing industry toward the automation of image registration. One known method of achieving image registration in the longitudinal web direction, which has won some limited acceptance in the industry, dictates the optical sensing of registration mark images on the web. The sensor output pulses are compared with reference pulses recurring at the same rate as the revolutions of the plate cylinders. Incremental phase or circumferential adjustment mechanisms for the plate cylinders are activated until the sensor output pulses agree with the reference pulses. We object to this prior art method, too, because it requires the preparation of the reference pulses recurring at the same rates as the revolutions of the plate cylinders, and of the registration marks such that the sensor output pulses will be in synchronism with the reference pulses when all the plate cylinders are in phase. The recurrence rates of the reference pulses, moreover, must be altered each time different diameter plate cylinders are mounted in the machine. As an additional drawback this known method does not lend itself to the lateral adjustment of the plate cylinders.

SUMMARY OF THE INVENTION

We have hereby invented a more advanced method of adjusting, in a web fed, multiple printing press of the class under consideration, both circumferential and lateral positions of the plate cylinders in order to achieve image registration in a shorter period of time than heretofore and at any time during the progress of printing.

Stated in brief, the image registration method of our invention is applicable to a rotary printing press including a series of print stations, each having a circumferentially and laterally adjustable plate cylinder, for successively printing image on a continuous web of material traveling along a predetermined path. According to the method there are first prepared printing plates for the respective print stations of the press, each prepared printing plate bearing in a preassigned different position thereon a registration mark having two line segments extending generally transversely with respect to the web and at an angle to each other. The relative positions of the registration marks on the prepared printing plates are such that when the printing plates are mounted on the respective plate cylinders in proper registration, the images of the registration marks thereby reproduced on the web are arranged in a row in the longitudinal direction of the web with predetermined spacings from one another. With the above prepared printing plates mounted on the respective plate cylinders of the press, there is started the printing of images, including those of the registration marks, from the printing plates on the web traveling at a predetermined speed. The printed images of the registration marks on the traveling web are sensed optically at a predetermined point intermediate the opposite extremities of the registration mark images in the transverse direction of the web, in order to ascertain the actual distances between the registration mark images and the actual distance between the two nonparallel line segments of each registration mark image at the predetermined intermediate point thereof. The above ascertained actual distances are converted into corresponding numbers of periodic reference pulses for comparison with prescribed numbers of such reference pulses representing proper distances between the registration mark images and a proper distance between the two line segments of each registration mark image. Then the angular position of any one or more of the plate cylinders is adjusted in accordance with a difference or differences, if any, between the reference pulse numbers representative of the actual distances between the registration mark images and the prescribed reference pulse numbers representative of the proper distances therebetween. The lateral position of any one or more of the plate cylinders, on the other hand, is adjusted in accordance with a difference or differences, if any, between the reference pulse number representative of the actual distance between the two line segments of each registration mark image and the prescribed reference pulse number representative of the proper distance therebetween.

Thus, in accordance with the method of our invention, the series of registration mark images reproduced on the web can be used for both circumferential and lateral adjustments of a required plate cylinder or cylinders. Such adjustments may be effected either manually or, preferably, automatically by means comprising a central processor unit as in a preferred example of the inventive method to be set forth subsequently.

The above and other features and advantages of our invention and the manner of realizing them will become more apparent, and the invention itself will best be understood, from a study of the following description and appended claims, with reference had to the attached drawings illustrating the preferred example of the inventive method.

DESCRIPTION OF THE PREFERRED EXAMPLE

Figure 1:
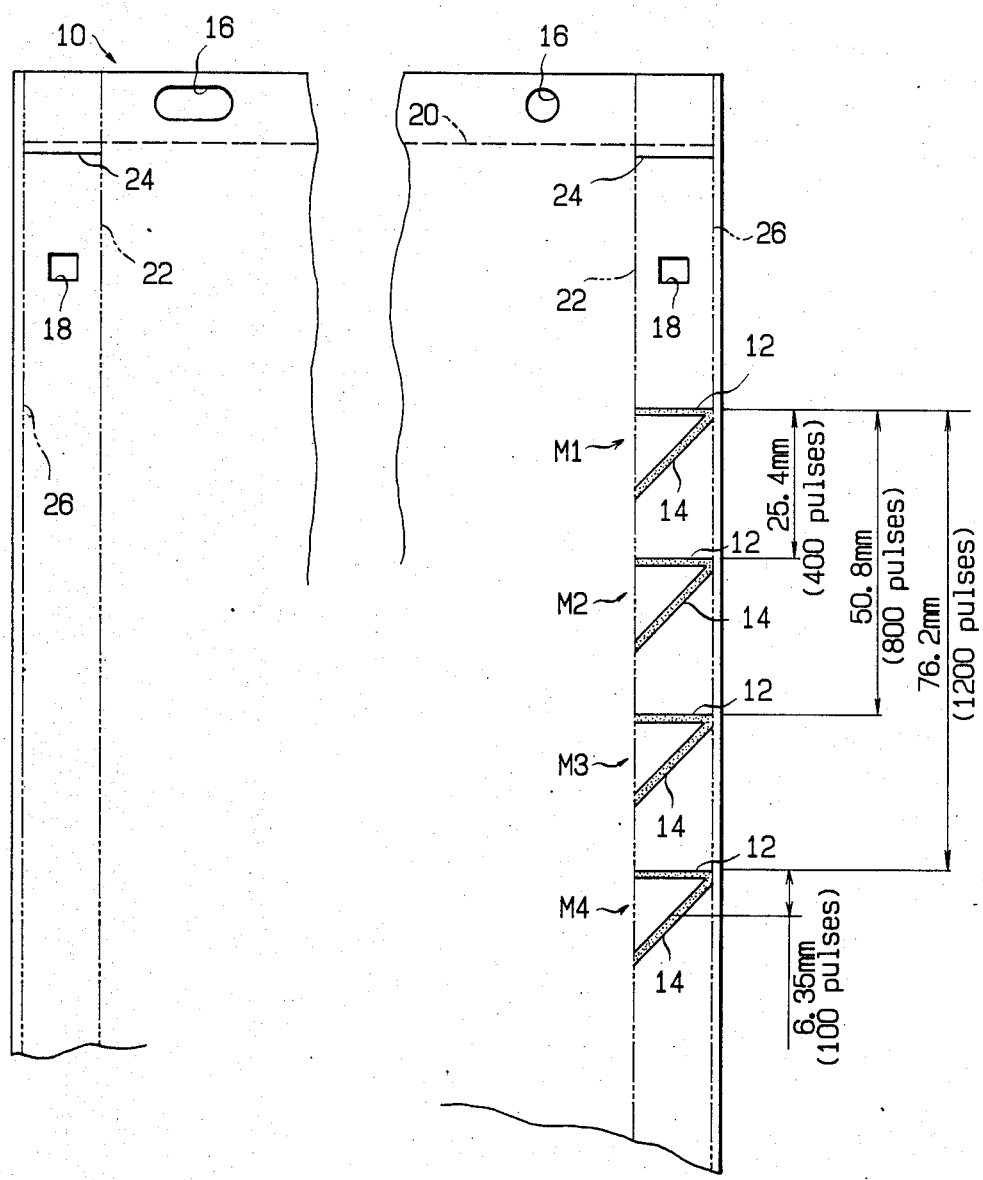
FIG. 1 is a fragmentary plan of a registration film for use in making printing plates bearing the required image registration marks in accordance with the method of our invention.

We will now discuss the image registration method of our invention as adapted specifically for a web printing press of the type disclosed in the aforementioned U.S. Pat. No. 4,177,730. The apparatus of this class comprises a series of print stations, each having a circumferentially and laterally adjustable plate cylinder, for successively imprinting images, which may be of different colors, on a continuous web of paper or like material traveling along a predetermined path. Let us assume by way of example that the particular apparatus under consideration has four print stations.

The image registration method of our invention starts with the preparation of printing plates for the respective print stations, each printing plate bearing a registration mark in a preassigned different position thereon. We have shown in FIG. 1 a registration film 10 for use in making such printing plates. The registration film 10 has a plurality of, four in this particular example, registration marks M1, M2, M3 and M4 arranged in a row, with constant pitch spacings therebetween, on one of its opposite marginal edge portions. Each of the registration marks M1 through M4 comprises two nonparallel line segments, that is, a first line segment 12 extending transversely with respect to the web on which the marks are to be imprinted as set forth hereafter, and a second line segment 14 extending at an angle to both longitudinal and transverse directions of the web. It is to be understood, however, that the transverse and angled arrangements of the first 12 and second 14 line segments of each registration mark are not essential, all that is required being that the images of the two line segments that have been reproduced on the web extend generally transversely thereof and at an angle to each other, as will become more fully understood as the description progresses.

As we have indicated in FIG. 1, we have set the pitch distance between every two neighboring ones of the registration marks at 25.4 millimeters, and the pitch distance between the first 12 and second 14 line segments of each registration mark at 6.35 millimeters as measured at a midpoint between the opposite extremities of the first line segment. Further the second line segment 14 of each registration mark was set at an angle of 45 degrees to the first line segment 12.

The registration film 10 has pin holes 16 and punch registration holes 18. Other indicated markings on the registration film 10 include a fold line 20, longitudinal perforation lines 22, cross perforation lines 24, and slit lines 26, which indicate the positions of various operations to be performed on the printed web. These, however, constitute no essential features of our present invention.

Then the registration film 10 may be placed over each copy film, not shown, bearing the copy to be printed, in order to make, as by photoetching, the printing plates for the respective print stations. Pins may be inserted in the pin holes 16 of the registration film 10 and in those of each copy film for the exact alignment of the films.

Each printing plate thus prepared carries the four registration marks M1 through M4 in addition to the copy. All but a required one of the four registration marks may then be erased, that is, made incapable of optical sensing. The "required" registration mark for each printing plate is the fourth mark M4 for the first printing plate (to be printed first on the web), the third mark M3 for the second printing plate, the second mark M2 for the third printing plate, and the first mark M1 for the fourth printing plate. These four printing plates may then be mounted on the plate cylinders at the corresponding print stations of the machine.

Then the machine may be set into operation for printing the images, including those of the registration marks M1 through M4, on the web traveling through the successive print stations at a predetermined speed and along a predetermined path. The relative positions of the four registration marks on the above prepared printing plates have been such that their images reproduced on the web will be arranged just as depicted in FIG. 1, forming a row in the longitudinal direction of the web along one edge thereof and with the predetermined constant spacings therebetween, if the four copy images are in exact registration.

Then the successive sets of four printed images of the registration marks on the traveling web may be sensed by a conventional optical sensor disposed downstream of the print stations and at the midpoint (or at any other predetermined point) of each registration mark in the transverse direction of the web. Such optical sensing of the registration mark images on the traveling web are intended for the determination of the actual pitch distances between the four registration mark images and the actual pitch distance between the first 12 and second 14 line segments of each mark (at its midpoint in the transverse direction of the web). The relative circumferential displacements of the four plate cylinders are ascertainable from the distances between the registration mark images, and the relative lateral displacements of the plate cylinders from the distances between the two line segments of the respective reigistration mark image.

Figure 2:
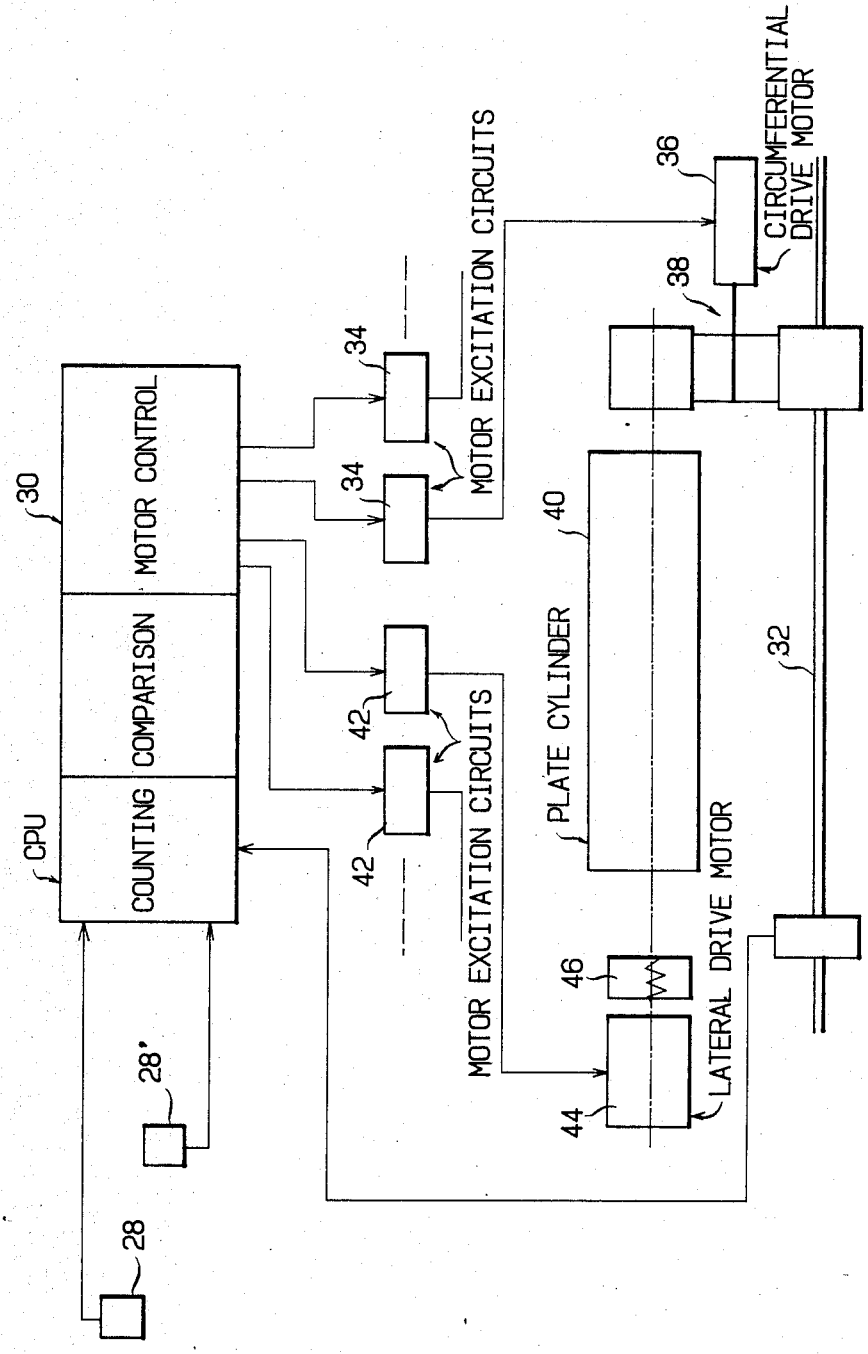
FIG. 2 is a schematic block diagram showing a preferred arrangement of means for adjusting both circumferential and lateral positions of each plate cylinder for image registration in accordance with the method of our invention.

We have indicated the optical sensor in block form designated 28 in FIG. 2. It will be seen that the optical sensor 28 is electrically connected to a central processor unit (CPU) 30. The subsequent discussion of our image registration method will be better understood by referring not only to this block diagram, which shows the means for the circumferential and lateral adjustments of the plate cylinders by our method, but also to the timing chart of FIG. 3.

Figure 3:
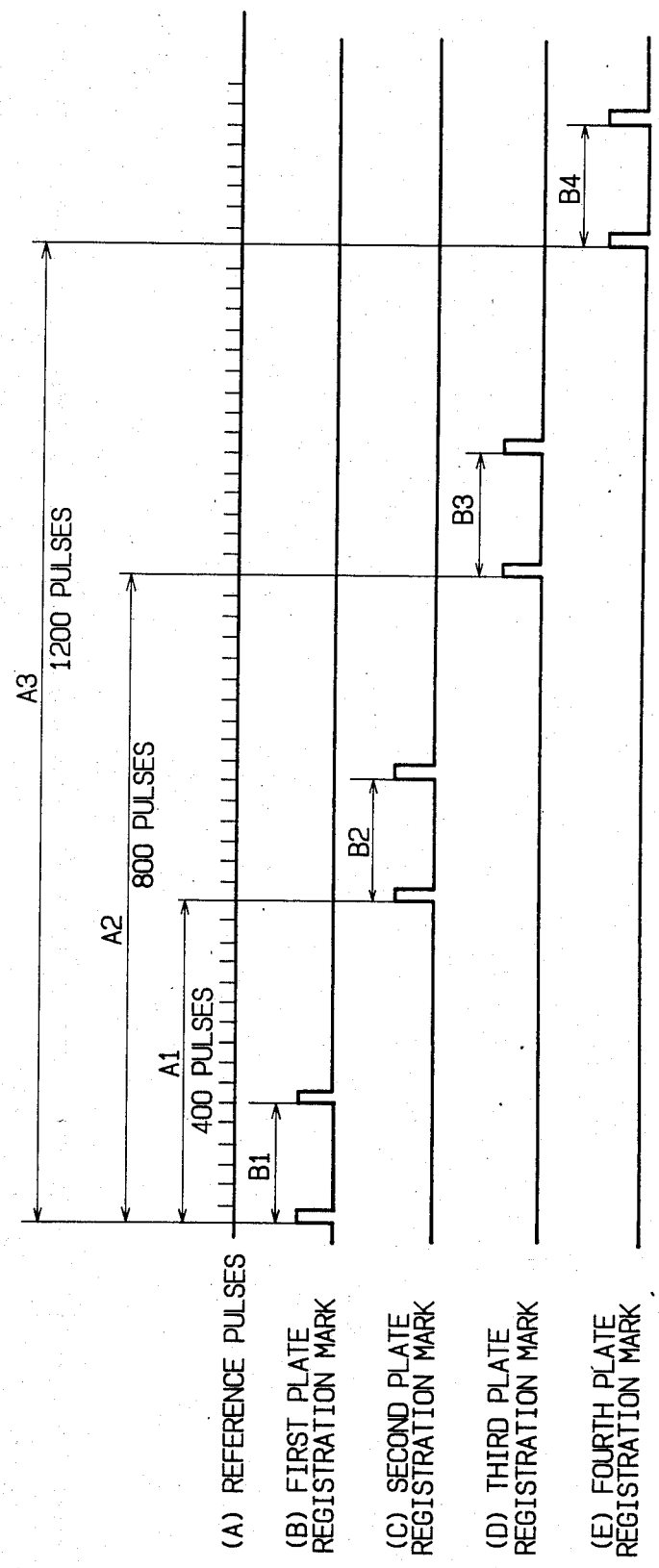
FIG. 3 is a timing diagram explanatory of the method of our invention.

Then the actual pitch distances between the four registration mark images, and the actual pitch distance between the first 12 and second 14 line segments of each registration mark image, both ascertainable by the output from the optical sensor 28, are converted into corresponding numbers of periodic reference pulses given at (A) in FIG. 3. Plotted at (B), (C), (D) and (E) in FIG. 3 are the output pulses from the optical sensor 28 indicate of the registration mark images M4, M3, M2 and M1 which have been printed from the first, second, third and fourth printing plates respectively.

For phasing the angular positions of the first and second plate cylinders, for example, the CPU 30 counts the number A1 of the reference pulses between the sensor output pulses of FIGS. (B) and (C) representative of the actual pitch distance between the registration mark images M4 and M3. Further the CPU 30 compares this reference pulses in number with with a predetermined number of the reference pulses indicative of the proper pitch distance between the registration marks. We understand that the repetition rate of the reference pulses has previously been determined in relation to the prescribed traveling speed of the web, by means of a rotary encoder, not shown, coupled to the common drive shaft 32, FIG. 2, of the printing press. We further assume that the web travels 0.0635 millimeter per reference pulse in this particular example of our method. Since the proper pitch distance between the registration marks is 25.4 millimeters, the number of reference pulses indicative of this proper pitch distance is 400, as indicated in FIG. 1.

It is now seen that the angular positions of the first and second plate cylinders are in phase if 400 is the number A1 of reference pulses that have been counted between the sensor output pulses of FIGS. 3(B) and (C) corresponding to the registration mark images M4 and M3. If not, then the angular positions of the first and second plate cylinders are out of phase to an extent indicated by the difference between the counted pulse number A1 and the proper pulse number of 400. Although the angular position of the second plate cylinder might then be manually adjusted to make the difference zero, we recommend automatic adjustment, as by means illustrated in FIG. 2.

Therein shown employed for such automatic circumferential arrangement of the plate cylinders are motor excitation circuits 34. provided one for each of the plate cylinders to be circumferentially adjusted. Each motor excitation circuit 34 has an input connected to the CPU 30 and an output connected to a circumferential drive motor 36 capable of accurate control of rotation, such for example as a direct current servomotor or pulse motor. This circumferential drive motor 36 in turn is coupled mechanically to a differential mechanism 38 through which the associated (e.g. the second) plate cylinder 40 is connected to the common drive shaft 32. The CPU 30 causes the motor excitation circuit 34 for the second plate cylinder 40 to excite the corresponding circumferential drive motor 36, for such a length of time that the angular position of the second plate cylinder 17 is varied, with respect to the common drive shaft 32, until it comes into phase with the angular position of the first plate cylinder. The output signal fed as above from the CPU 30 to the selected excitation circuit 34 depends, of course, on the difference between the counted pulse number A1 representative of the actual distance between the two registration mark images in question and the predetermined pulse number (400) representative of the proper distance therebetween.

The third and fourth plate cylinders can likewise be circumferentially adjusted with respect to the first plate cylinder. As will be seen by referring again to FIG. 3, the predetermined pulse numbers representative of the correct pitch distances between the registration mark image for the first plate cylinder and that for the third plate cylinder, and between the registration mark image for the first plate cylinder and that for the fourth plate cylinder, are 800 and 1200 respectively. If the corresponding counted pulse numbers A2 and A3 differ from these predetermined values, the angular positions of the third and fourth plate cylinders may be varied correspondingly just as described above in conjunction with the second plate cylinder.

We must point out, however, that the above described adjustments of the angular positions of the second, third and fourth plate cylinders to that of the first plate cylinder are by way of example only. Alternatively, then, the number of reference pulses may be counted between every two neighboring registration mark images and compared with the predetermined pulse number of 400. Each plate cylinder may then be circumferentially adjusted to make the difference between these pulse numbers zero.

We will now proceed to the description of the lateral adjustment of the four plate cylinders. The distance between the two nonparallel line segments 12 and 14 of each registration mark image on the web, as measured in the fixed position of the optical sensor, varies in proportion to the extent of lateral displacement of the corresponding plate cylinder. Thus, as the optical sensor 28 puts out two pulses, as at (B), (C), (D) and (E) in FIG. 3, upon sensing each registration mark image, the CPU 30 counts the number B1, B2, B3 or B4 of reference pulses between these pulses for the determination, in terms of the reference pulse number, of the actual pitch distance between the first 12 and second 14 line segments of each registration mark image. Each counted reference pulse number is then compared with a predetermined number of such pulses indicative of the correct pitch distance between the two line segments of each registration mark image, that is, the distance therebetween as measured at the exact midpoint of each image in the transverse direction of the web. Since the web travels 0.0635 millimeter per reference pulse, and since the proper pitch distance between the two line segments is 6.35 millimeters, in this particular example of our method, the predetermined number of reference pulses representative of this proper pitch distance is 100.

Accordingly, if the counted pulse number representative of the actual distance between the two line segments 12 and 14 of each registration mark image exceeds or falls short of 100, the CPU 30 puts out a signal for causing lateral displacement of the corresponding plate cylinder to an extent determined by the difference between the counted and the predetermined pulse numbers. FIG. 2 shows also the means for such lateral adjustment of the plate cylinders. The lateral adjustment means comprises motor excitation circuits 42 each connected between the CPU 30 and a lateral drive motor 44 coupled via a rotary to linear converter 46 to one of the plate cylinders. In response to the output from the CPU 30, each motor excitation circuit 42 energizes the associated lateral drive motor 44 until, with the consequent lateral displacement of the plate cylinder 40, the difference between the counted and the predetermined pulse numbers becomes zero.

However, the lateral adjustment of each and every plate cylinder in accordance with the difference between the counted and the predetermined pulse numbers is not essential. As an alternative, the counted pulse number indicative of the actual distance between the two line segments of the registration mark image from the first printing plate may be compared with the counted pulse number indicative of the actual distance between the two line segments of the registration mark image from each of the second, third and fourth printing plates. Then the lateral positions of the second, third and fourth printing plates may be adjusted as required to that of the first printing plate, just as the angular positions of the second, third and fourth printing plates have been adjusted to that of the first printing plate.

Figure 4:
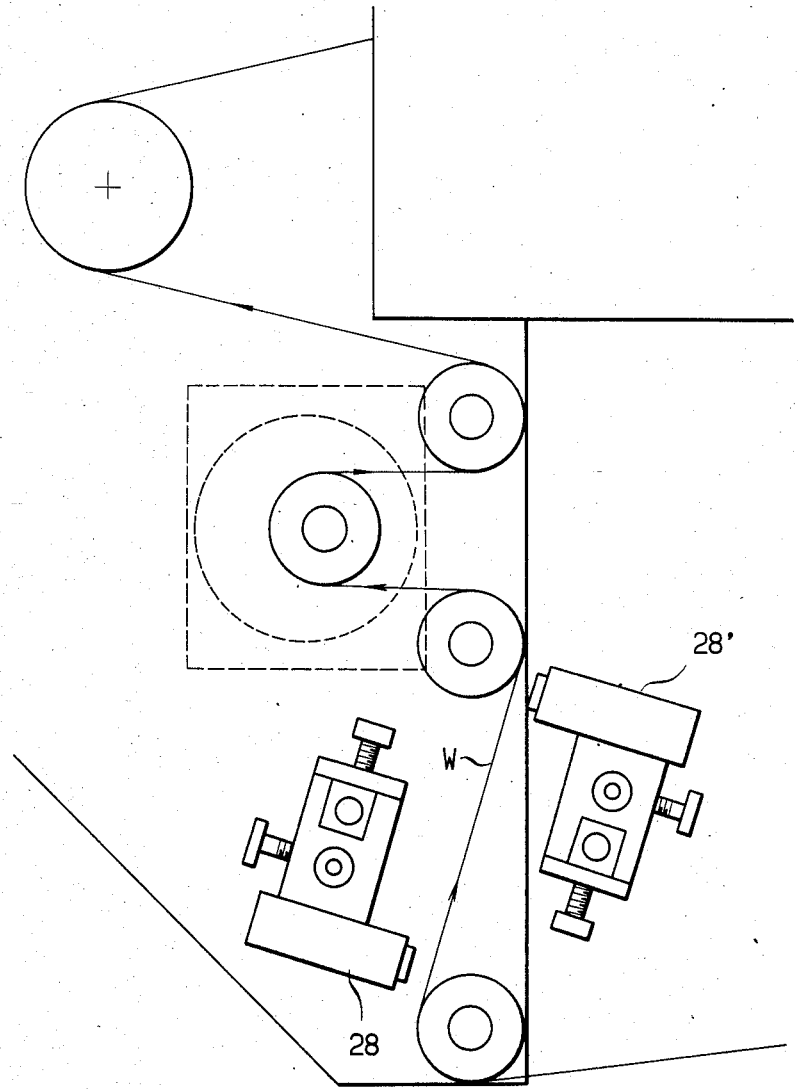
FIG. 4 is a diagrammatic, fragmentary elevation of the web printing press to which our invention is applicable, showing in particular the arrangement of a pair of optical sensors for use in image registration on both sides of the web.

While the foregoing example of our method has been directed to the registration of images on one side of the web, our method is applicable to simultaneous image registration on both sides of the web. In that case the successive sets of registration mark images on both sides of the web may be offset in the longitudinal web direction. Further the two required optical sensors may also be arranged in offset relation to each other in the longitudinal direction of the web in order to avoid mutual interference. We have illustrated such preferred arrangement of the two optical sensors in FIG. 4, wherein the additional optical sensor is designated 28' and lies on the opposite side of the web W with respect to the other optical sensor 28 in the offset relation thereto.

Although we have disclosed the image registration method of our invention in very specific aspects thereof, we understand that all matter contained herein is by way of example only and not to impose limitations upon our invention. Changes may therefore be made in the above disclosed example of our method without departing from the scope of the invention.

We claim:

1. A method of achieving image registration in a web fed rotary printing press of the type including a series of print stations, each having a circumferentially and laterally adjustable plate cylinder, for successively printing images on a continuous web of material traveling along a predetermined path, which method comprises:
   (a) preparing printing plates for the respective print stations of the web feb rotary press, each prepared printing plate hearing in a preassigned different position thereon a registration mark having two nonparallel line segments generally extending transversely with respect to the web, the relative positions of the registration marks on the prepared printing plates being such that when the printing plates are mounted on the respective plate cylinders in proper registration, the images of the registration marks thereby reproduced on the web are arranged in a row in the longitudinal direction of the web at predetermined distances from one another:
   (b) mounting the above prepared printing plates on the respective plate cylinders of the press;
   (c) starting the printing of images, including those of the registration marks, from the printing plates on the web traveling along the predetermined path at a predetermined speed;
   (d) optically sensing the printed images of the registration marks on the traveling web at a predetermined point intermediate the opposite extremities of the registration mark images in the transverse direction of the web, in order to ascertain the actual distances between the registration mark images and the actual distance between the two line segments of each registration mark image at the predetermined intermediate point thereof;
   (e) converting the above ascertained actual distances into corresponding numbers of periodic reference pulses;
   (f) comparing the numbers of reference pulses representing the actual distances between the registration mark images and between the two line segments of each registration mark image with prescribed numbers of such reference pulses representing the proper distances between the registration mark images and a proper spacing between the two line segments of each registration mark image, respectively;
   (g) adjusting the angular position of any one or more of the plate cylinders in accordance with a difference or differences, if any, between the reference pulse numbers representative of the actual distances between the the registration mark images and the prescribed reference pulse numbers representative of the proper distances therebetween; and
   (h) adjusting the lateral position of any one or more of the plate cylinders in accordance with a difference or differences, if any, between the reference pulse number representative of the actual distance between the two line segments of each registration mark image and the prescribed reference pulse number representative of the proper distance therebetween.

2. The image registration method of claim 1 wherein the printing plates bearing the registration marks are prepared by:
   (a) preparing a registration film having the row of registration marks in the preassigned different positions thereon:
   (b) superposing the registration film over each of copy films bearing copy to be printed;
   (c) making each printing plate through the superposed registration film and copy film; and
   (d) making all but a required one of the registration marks on each printing plate incapable of optical sensing.

3. The image registration method of claim 1 wherein a first of the two line segments of each registration mark extends transversely with respect to the web, and the second line segment of each registration mark extends at an angle to the first line segment.

4. The image registration method of claim 1 wherein the adjustments of the angular and lateral positions of any one or more of the plate cylinders are performed automatically.

* * * * *